July 18, 1933. H. R. CRANE 1,918,522

EXPANDING MANDREL

Filed Aug. 18, 1931

INVENTOR,
H. R. Crane;
BY
ATTORNEY.

Patented July 18, 1933

1,918,522

UNITED STATES PATENT OFFICE

HUBERT R. CRANE, OF LOS ANGELES, CALIFORNIA, ASSIGNOR OF ONE-SIXTH TO ORIN J. BUCKLEY, ONE-SIXTH TO EARL H. McKEEN, AND ONE-SIXTH TO HARRY N. HAYNES, ALL OF LOS ANGELES, CALIFORNIA

EXPANDING MANDREL

Application filed August 18, 1931. Serial No. 557,854.

This invention relates to mechanic's tools and more especially to a tool in the nature of an expanding mandrel, and whose expanding action is accomplished upon relative rotation of certain parts without any relative axial action of parts as is common in many forms of expansion mandrels.

An object is to provide a tool incorporating a stock body provided with an arbor having a cross-section of such contour as to present a plurality of angular, longitudinal corners which are designed to counter-thrust against mutual bore angles in a set of expansion parts which, assembled, present one or more peripheral, biting surfaces of arbitrary diameter, in echelon.

Again, an object is to provide an expansion, binding tool having an expansion collar which may be instantly expanded by relative rotation of an internal arbor in either direction.

And a further object is to provide a mandrel including an expansion collar having capacity for internally engaging one or another of objects having bores of different diameter and complementary to the collar sizes.

An additional object is to provide for the ready interchange of one or another of a supply of collars selective for use on given bore-size objects (or work pieces).

The invention consists of certain advancements in this art as set forth in the ensuing disclosure and having, with the above, additional objects and advantages, and whose construction, combination and details of means, and manner of operation will be made manifest in the description of the herewith illustrative embodiment; it being understood that modifications, variations and adaptions may be resorted to within the scope, principle and spirit of the invention as it is more directly claimed hereinafter.

Figure 1:
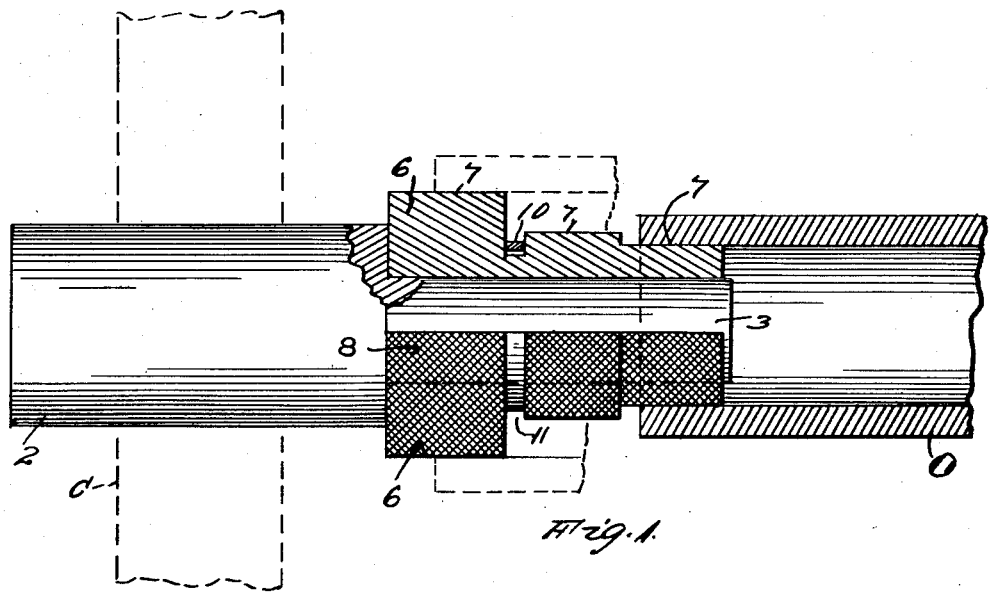
Figure 1 is a sectional, elevation of the tool, indicating a mode of use.

In the embodiments shown the tool includes a stock body 2 of any desired cross-section and forming a handle or purchase bar to be rotated, as in a chuck C (dotted lines, Fig. 1). One end of this stock is provided with an arbor body 3 which may be of various cross-sectional shapes all characterized as presenting symmetrical pairs of diametrically opposite angle shoulders 4 which extend longitudinally of the arbor 3.

Figure 3:
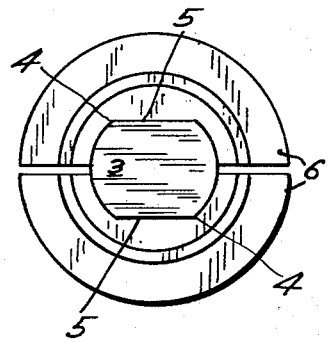
Figure 3 is an end view showing one form of arbor body.
Figure 4:
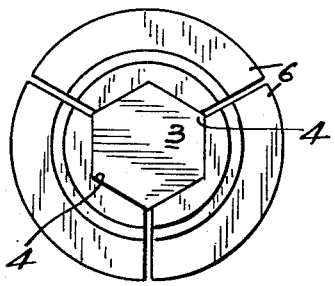
Figures 4 and 5 show variant arbor body forms.
Figure 5:
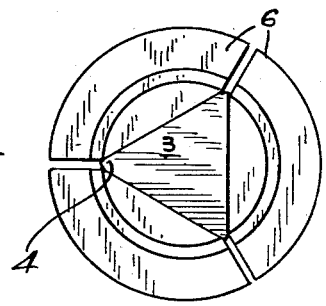
Figure 2:
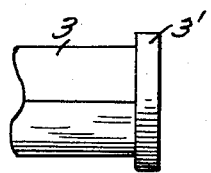
Figure 2 is a detail showing a headed arbor.

In Fig. 3 the arbor 3 is shown as of cylinder form with opposite cut-away sides 5—5 to produce corners 4—4. Fig. 4 shows a simple hexagon-section arbor, and Fig. 5, shows a triangle-section arbor.

In any of its forms, the arbor is encompassed by an expansible collar composed of a plurality of duplicate pieces 6—6, which, when assembled, present a bore which is complementary to the arbor 3.

In use and operation of the mandrel collar pieces 6—6 will instantly expand under the thrust of the shoulders 4 and the peripheral face of the mandrel will bind on the bore surface of a complementary work object O. The collar may have only one peripheral diameter as 7 which is knurled at 8, but preferably the collar has echelon faces 7 of desired diameter so that the one collar may be used on various bore-size objects, without change of position and avoiding change of collar for each size. The symmetrical shape and arrangement of the arbor corners 4—4 is such that they act effectively upon rotation of the arbor in either direction. This is an important advantage in screwing and unscrewing parts.

If desired the arbor 3 may have a shoulder or head 3' to retain the collar against end shift. Preferably the collar pieces are loosely retained by a spring yoke 10 lying in a groove 11 in the collar parts, but not contracting them tight onto the arbor.

What is claimed is:

In a tool of the class described, a stock shank having elongated, longitudinal, parallel-angle shoulders parallel to and equidistant from the axis of the shank, and an elongated, split collar formed of duplicate segments each of which has peripheral portions of various diameters along its length and each portion having external teeth for biting in a bore wall; said segments forming substantially complete cylinders and operatively fitting said shank in either of reversed positions thereon, and said shoulders operative to thrust the segments radially according to the direction of shank rotation and enable biting effect of the teeth on rotation of the collar in either direction by the shank.

HUBERT R. CRANE.